(12) United States Patent
Benthien et al.

(10) Patent No.: US 8,756,769 B2
(45) Date of Patent: Jun. 24, 2014

(54) HOLDING DEVICE FOR AT LEAST ONE FIXTURE TO A CELL STRUCTURE OF AN AIRCRAFT FUSELAGE

(71) Applicant: Airbus Operation GmbH, Hamburg (DE)

(72) Inventors: Hermann Benthien, Sottrum (DE); Axel Söffker, Sottrum (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/657,944

(22) Filed: Oct. 23, 2012

(65) Prior Publication Data

US 2013/0105067 A1    May 2, 2013

Related U.S. Application Data

(60) Provisional application No. 61/552,542, filed on Oct. 28, 2011.

(30) Foreign Application Priority Data

Oct. 28, 2011    (DE) .......................... 10 2011 117 185

(51) Int. Cl.
    *A44B 18/00*    (2006.01)
(52) U.S. Cl.
    USPC ............................... 24/442; 428/100; 156/91
(58) Field of Classification Search
    CPC ........... A44B 18/0007; A44B 18/0011; A44B 18/0015; A44B 18/0019; A44B 18/0057; A44B 18/0061; A44B 18/008; B64C 1/406; B29L 2031/729

USPC ........ 428/100; 244/117 R, 119, 129.1, 137.4; 174/21 R, 24, 64, 68.1; 24/442, 448; 156/91

See application file for complete search history.

(56) References Cited

U.S. PATENT DOCUMENTS

| 2,650,948 | A | * | 9/1953 | Findlay | 174/168 |
| 4,223,053 | A | * | 9/1980 | Brogan | 428/34.5 |
| 4,239,829 | A | * | 12/1980 | Cohen | 428/86 |
| 6,124,015 | A | | 9/2000 | Baker et al. | |
| 7,485,808 | B2 | * | 2/2009 | Guthke et al. | 174/72 A |
| 2009/0159750 | A1 | * | 6/2009 | Sayilgan et al. | 244/131 |

FOREIGN PATENT DOCUMENTS

| DE | 102007061425 A1 | 7/2009 |
| DE | 102008041230 A1 | 2/2010 |
| DE | 102008041259 A1 | 2/2010 |
| DE | 102009002839 A1 | 11/2010 |
| EP | 0 625 458 A1 | 11/1994 |

* cited by examiner

*Primary Examiner* — Katarzyna Wyrozebski Lee
*Assistant Examiner* — Carson Gross
(74) *Attorney, Agent, or Firm* — Lerner, David, Littenberg, Krumholz & Mentlik, LLP

(57) ABSTRACT

A holding device for attaching at least one fixture to a fuselage cell structure of an aircraft, includes a basic element attached to the fuselage cell structure, to which at least one fixture element to accommodate the fixture is fastened, wherein the basic element is embodied as a hook-and-loop element, the hook-and-loop bristles of which co-act with corresponding hook-and-loop bristles of at least one fixture element, which is also embodied as a hook-and-loop element thus forming a hook-and-loop connection, wherein the space between the interengaging hook-and-loop bristles is filled with an adhesive.

7 Claims, 2 Drawing Sheets

HOLDING DEVICE FOR AT LEAST ONE FIXTURE TO A CELL STRUCTURE OF AN AIRCRAFT FUSELAGE

CROSS-REFERENCE TO RELATED APPLICATIONS

The present application claims the benefit of the filing date of U.S. Provisional Patent Application No. 61/552,542 filed Oct. 28, 2011, the disclosure of which is hereby incorporated herein by reference.

AREA OF THE INVENTION

The invention relates to a holding device for at least one fixture to a cell structure of an aircraft fuselage, having attached at its fuselage cell structure a basic element, at which at least one fixture element is fastened to accommodate the fixture. The invention further relates to a method of production of such a holding device.

The area of application of the invention extends to the construction of aircraft. Particularly in commercial aircraft with large-volume fuselages, a multitude of electric cables, hydraulic conduits and similar proceed along the fuselage cell structure. The fuselage cell structure usually comprises longitudinal stringers and ribs that are arranged transversely thereto, which support the outer shell of the aircraft fuselage. Fixtures, particularly electric cables or hydraulic conduits, are installed on the inside with the aid of holding devices during the assembly of the aircraft in order to retain their intended position.

BACKGROUND OF THE INVENTION

According to the generally known state of the art, holding devices of interest at this point may be attached to the fuselage cell structure by means of screw connections. To this end, at least one fastening bore into the fuselage cell structure would need to be incorporated for each of the holding devices that are to be attached, in which a basic element of the holding device may be fastened by means of a fastening element.

The multitude of fastening bores leads to a static weakening of the fuselage cell structure and, in addition, causes corrosion problems within the area of the bearing stress, which must be prevented by extensive corrosion protection measures such as, for example, sealing of the bearings applying suitable materials. Furthermore, every area exposed to bearing stress creates a preferred initiation point for fatigue cracks, the discovery and removal of which requires an increased inspection and maintenance effort over the whole lifecycle interval of the aircraft. In addition, any drilling of a fastening borehole taken as an individual process is quite extensive with regard to process technology, as the positioning of the usually manual drilling devices is usually carried out by using large-format master plates. The resulting drilling chips must also be carefully removed from the fuselage cell structure by means of suction to prevent short circuits and any additional corrosion problems.

Therefore, DE 10 2007 061 425 A1 discloses a holding device for attaching a fixture at a fuselage cell structure of an aircraft, which may be affixed laterally to the fuselage cell structure without applying fastening bores. To this end, the crossing point between a stringer and a rib is used, into which a connecting angle of the holding device may be clamped. The holding device is embodied in two parts and comprises a lower part and an upper part, which may be connected thereto. The lower part may be slid onto the connecting angle. By fitting the upper part onto the lower part, the holding device assumes its fixed position after being fastened at the crossing point. Final fastening and positioning is obtained by connecting the holding device to a transverse circuit carrier by means of an expanding pin.

DE 10 2008 041 259 A1 discloses another solution to provide a connection without fastening means of a holding device at the fuselage cell structure of an aircraft, which is based on adhesive bonding. An adhesive holder comprises a basic body, which is connectible to an attachment. The basic body and the attachment are each formed in one piece of a metallic material. At least three lugs are arranged at the basic body to provide an adhesive connection at the fuselage cell structure. In doing so, at least two lugs are positioned at one connection level, and at least one further lug is positioned at a second connection level to allow fastening at an edge of the structural component. To allow fastening at plane structural components, all three lugs are arranged at one connection level. As a consequence of the presence of at least three lugs, the adhesive holder is damage tolerant such that even in the event of failure of two adhesive lugs no loss of functionality occurs. However, the load-bearing capacity of said adhesive holder is limited and, therefore, not suitable for all kinds of fixtures.

An embodiment of the present invention provides a holding device for attachment of at least one fixture at a fuselage cell structure of an aircraft not requiring any bore holes, which can be manufactured in a simple manner and which resists the high stress caused by the fixture.

BRIEF SUMMARY OF THE INVENTION

An aspect of the invention includes the technical teaching that the basic element of a holding device is embodied as a fibre hook-and-loop element, the hook-and-loop bristles of which co-act with corresponding hook-and-loop bristles of at least one fixture which is also embodied as a hook-and-loop element thus forming a hook-and-loop connection, in the process of which the space between the interengaged hook-and-loop bristles is filled with an adhesive.

The advantage of the solution according to an aspect of the invention is, in particular, that a composite part can be manufactured by applying prefabricated basic elements and fixtures made of fibre hook-and-loop semi-finished products, subsequently injecting an adhesive followed by hardening, which can be simply assembled locally and, after the hardening of the adhesive is completed, is highly resistant to static stress. The holding device according to an embodiment of the invention can be applied without chip-generating processing and without any additional connecting elements. A precondition for high stress resilience is obtained as the basic element is integrally connected with the fixture elements. By means of resorting to hook-and-loop technology, component tolerances can be compensated in a simple manner. Problems with respect to a differing thermal extension of the components to be fastened to one another, or with regard to electrochemical corrosion will not occur, because the holding device according to an embodiment of the invention does not need any metal. By means of a system comprising basic elements and fixture elements it is possible to offer a simple building block approach for the production of holding devices of different sizes and shapes.

To this end, it is, therefore, suggested that the at least one fixture element shows in its cross section a polygonal or triangular shape having hook-and-loop bristles pointing to the outside. In the case of triangular fixture elements, several of those may be fastened to one another to form a lattice structure similar to a cross beam, wherein the space between the fixture elements, again, is filled with an adhesive.

By means of such a lattice structure similar to a cross beam, which comprises individual triangles, almost any lattice surface may be formed in a simple manner, whereby the hook-and-loop connections of the individual components among one another guarantee a three-axial compensation of tolerance.

In this process, a hardenable synthetic resin material may be applied as an adhesive, the hardening of which may be accelerated by microwaves. Besides that it is, however, also conceivable to use suitable cold curing adhesives as an adhesive to fill the space between the basic element and the fixture element, or between fixture elements among one another.

Preferably, the fixture element arranged furthest from the basic element and the interior cross section together form a passage opening for guiding through the fixture. When triangular fixture elements are applied, the passage opening is triangular as well. Besides this it is also conceivable that a fixture may be attached by means of hook-and-loop tape at the fixture element on the outside. Said connection, however, may be protected against self-loosening, for example, by adhesive bonding.

According to another measure of the invention it is proposed to attach the basic element of the holding device according to an embodiment of the invention to the fuselage cell structure by means of lamination. This measure is particularly applicable when the fuselage cell structure consists of a fibre-reinforced synthetic material. In this case, by lamination of the basic elements, the fastening points for the holding devices may already be defined during the process of production of the fuselage cell structure. Besides that, it is, however, also conceivable to bond the basic elements to the fuselage cell structure.

The holding device according to an embodiment of the invention, which is generally described above, can be installed by the following production steps:
Attaching of a basic element embodied as a hook-and-loop element to the fuselage cell structure such that its hook-and-loop bristles point to the outside,
Fastening of at least one fixture element to the basic element by creating a hook-and-loop connection, and
Filling of the space formed between the engaged hook-and-loop bristles with an adhesive, which will subsequently harden.

Further fixture elements may be fastened in the manner described above to the fixture mounted such that a lattice structure is obtained, in the process of which the space between the hook-and-loop bristles, again, will need to be filled with an adhesive.

BRIEF DESCRIPTION OF THE DRAWINGS

Further aspects of the invention are shown in more detail by means of the figures in the following, together with a description of a preferred example of embodiment of the invention. It is shown.

DETAILED DESCRIPTION

Figure 1:
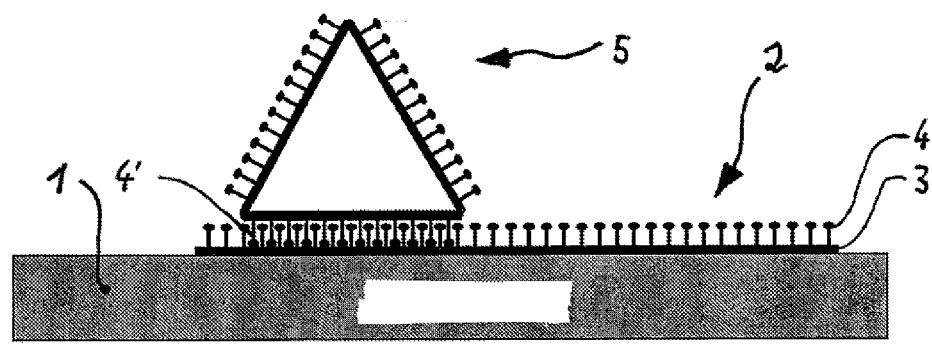
FIG. 1 a schematic lateral view of a first intermediate assembly step of production of the holding device,
FIG. 2 a schematic lateral view of a second intermediate assembly step of production of the holding device, and
FIG. 3 a schematic lateral view of a third intermediate assembly step of production of the holding device.

According to FIG. 1, a basic element (2) is attached to a fuselage cell structure (1) of an aircraft, which is only schematically represented here, in this case by adhesive bonding of the basic element (2) to the surface of the fuselage cell structure (1).

The basic element (2) is embodied as a hook-and-loop element and comprises a carrier (3), from which a plurality of hook-and-loop bristles (4) arranged spaced apart from one another point to the outside in a generally known manner. The hook-and-loop bristles (4) of the basic element (2) co-act with corresponding hook-and-loop bristles (4') on the side of a fixture element (5). The fixture element (5) thus forms a hook-and-loop connection with the basic element (2). The fixture element (5) shows in its cross section a triangular form having hook-and-loop bristles (4') pointing to the outside at all sides.

Figure 2:
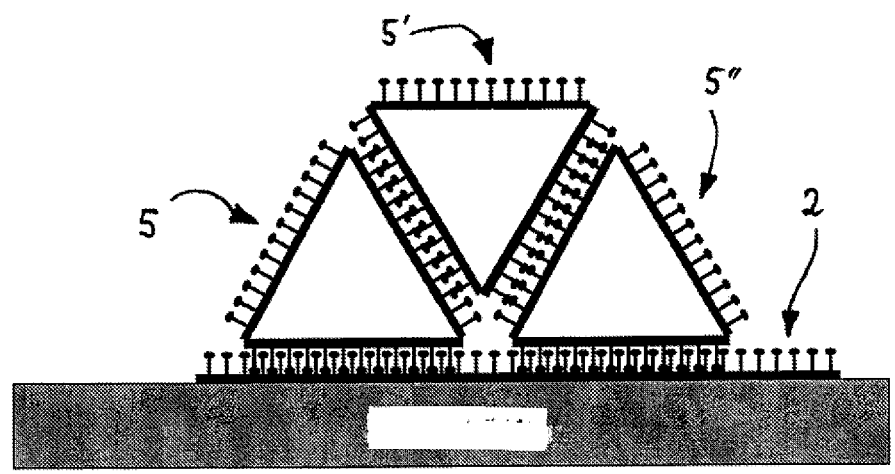

According to FIG. 2, additional fixture elements (5' and 5") are added to the basic element (2) and to the fixture element (5) such that a lattice structure similar to a cross beam is obtained.

Figure 3:
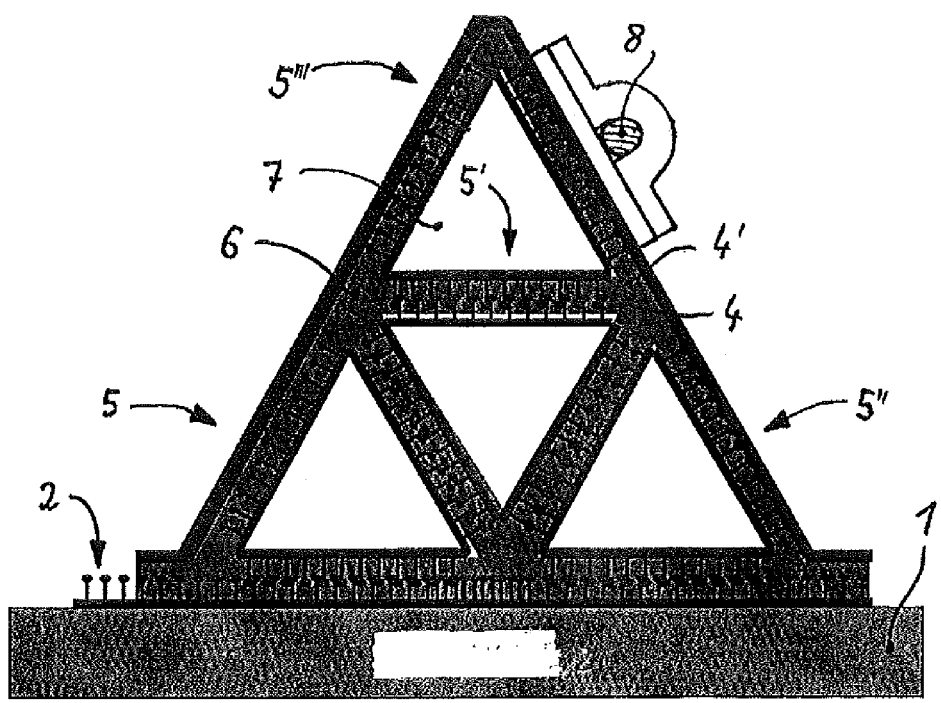

The lattice structure similar to a cross beam according to FIG. 3, extended by a further fixture element (5'''), is filled in the space between the engaging bristles (4, 4') with an adhesive (6) comprising a hardenable synthetic resin material. The fixture element (5'''), which is furthest away when viewed from the basic element (2), has a passage opening (7), through which a tubular fixture (8) (exemplarily) is guided to pass it along the fuselage cell structure (1), which is not further shown.

In addition it needs to be pointed out that "comprise" or "consist of" does not exclude any other elements or steps, and "one" does not exclude a plurality. Furthermore it is pointed out that features or steps, which are described with reference to any one of the examples of embodiment mentioned above, may also be used in combination with any other features or steps of any other examples of embodiment described above. Reference signs in the claims are not to be regarded as limitations.

LIST OF REFERENCE SIGNS

1 Fuselage cell structure
2 Basic element
3 Carrier
4 Hook-and-loop bristles
5 Fixture element
6 Adhesive
7 Passage opening
8 Fixture

The invention claimed is:
1. A holding device for attaching at least one fixture to a fuselage cell structure of an aircraft, comprising:
a basic element attached at a fuselage cell structure, the basic element comprising a first hook-and-loop element comprising a first plurality of hook-and-loop bristles;
at least one fixture element to accommodate the at least one fixture, the at least one fixture element comprising a second hook-and-loop element comprising a second plurality of hook-and-loop element configured to co-act with the first plurality of hook-and-loop bristles to form a hook-and-loop connection; and
a first adhesive filling the space between interengaging first and second pluralities of hook-and-loop bristles;
wherein at least one fixture is attached by a hook-and-loop tape at the fixture element on the outside.
2. The holding device according to claim 1, wherein the adhesive comprises a synthetic resin material configured to be hardened.

3. The holding device according to claim 1, wherein the at least one fixture element comprises a cross-section of a polygonal or triangular form having the second plurality of hook-and-loop bristles pointing to the outside.

4. The holding device according to claim 3, further comprising a plurality of triangular fixture elements fastened to one another to obtain a lattice structure similar to a cross beam; and a second adhesive filling the space therebetween.

5. The holding device according to claim 3, wherein the fixture element comprises a passage opening for guiding through the at least one fixture.

6. The holding device according to claim 1, wherein the basic element is attached to the fuselage cell structure by laminating or adhesive bonding.

7. The holding device according to claim 1, wherein the fixture comprises at least one electric cable or a fluid-carrying pipeline.

\* \* \* \* \*